(12) United States Patent
Chupka et al.

(10) Patent No.: US 11,124,912 B2
(45) Date of Patent: Sep. 21, 2021

(54) PLANETARY HELICAL GEAR TRAIN FOR A TRANSMISSION ASSEMBLY OF A WASHING MACHINE APPLIANCE

(71) Applicant: Haier US Appliance Solutions, Inc., Wilmington, DE (US)

(72) Inventors: Edward Simeon Chupka, Bardstown, KY (US); David Coxon, Shepherdsville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 481 days.

(21) Appl. No.: 16/059,120

(22) Filed: Aug. 9, 2018

(65) Prior Publication Data
US 2020/0048812 A1    Feb. 13, 2020

(51) Int. Cl.
| | |
|---|---|
| *D06F 37/40* | (2006.01) |
| *D06F 23/04* | (2006.01) |
| *D06F 37/30* | (2020.01) |
| *D06F 37/18* | (2006.01) |
| *F16H 57/00* | (2012.01) |
| *H02K 7/12* | (2006.01) |

(52) U.S. Cl.
CPC .............. *D06F 37/40* (2013.01); *D06F 23/04* (2013.01); *D06F 37/30* (2013.01); *D06F 37/18* (2013.01); *F16H 57/0006* (2013.01); *H02K 7/125* (2013.01)

(58) Field of Classification Search
CPC ........... D06F 23/04; D06F 39/30; D06F 39/40
See application file for complete search history.

(56) References Cited

U.S. PATENT DOCUMENTS

| | | | | |
|---|---|---|---|---|
| 6,077,184 | A * | 6/2000 | Lee .......................... | D06F 37/40 475/331 |
| 2002/0069679 | A1 | 6/2002 | Skrippek et al. | |
| 2017/0191203 | A1* | 7/2017 | Kim ....................... | D06F 37/206 |
| 2018/0105970 | A1* | 4/2018 | Basheer ................... | A47L 15/44 |

FOREIGN PATENT DOCUMENTS

JP        H0380896 A   *   4/1991

\* cited by examiner

*Primary Examiner* — Joseph L. Perrin
(74) *Attorney, Agent, or Firm* — Dority & Manning, P.A.

(57) ABSTRACT

A vertical axis washing machine appliance having a transmission assembly with a planetary helical gear train is provided. The transmission assembly transmits mechanical power from a torque source to an agitation element so that oscillatory motion may be imparted to laundry articles within a wash basket of the washing machine appliance, e.g., during a wash cycle. The transmission assembly includes features that manage axial thrust loads created by helical gears of the gear train. The transmission assembly also includes features that prevent shuttling of the gears and other components of the transmission assembly.

20 Claims, 10 Drawing Sheets

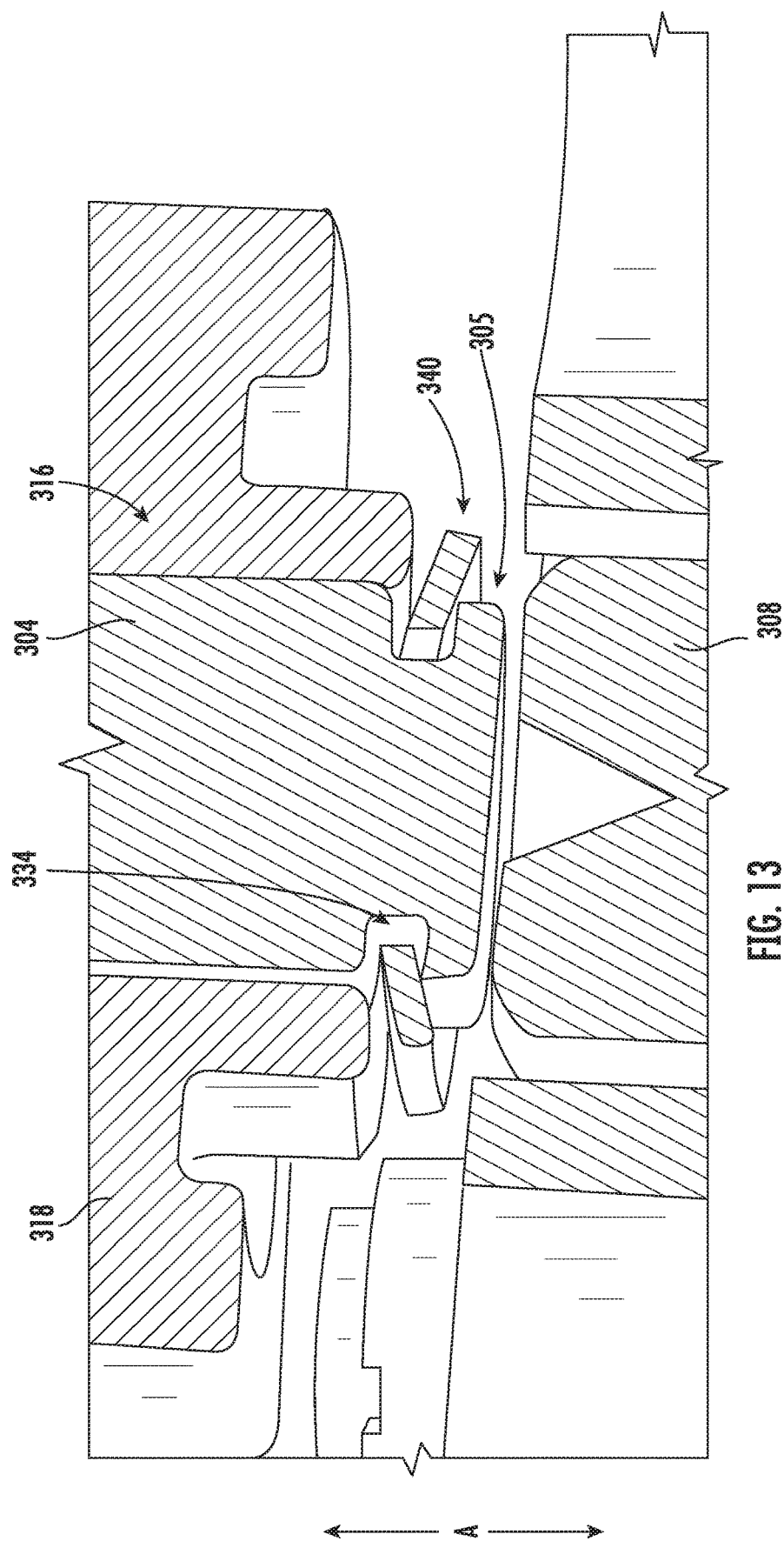

PLANETARY HELICAL GEAR TRAIN FOR A TRANSMISSION ASSEMBLY OF A WASHING MACHINE APPLIANCE

FIELD OF THE INVENTION

The subject matter of the present disclosure relates generally to washing machine appliances and more particularly to planetary helical gear transmissions for vertical axis washing machine appliances.

BACKGROUND OF THE INVENTION

Washing machines are typically equipped to operate in one or more modes or cycles, such as e.g., wash, rinse, and spin modes. During a wash or rinse mode for a vertical axis washing machine, the laundry articles are usually submerged at least partially within a wash or rinse fluid while an agitator is used to agitate or move laundry articles contained within a wash basket of the washing machine. The agitator may be controlled to rotate clockwise and counterclockwise to achieve a particular agitation stroke to impart an oscillatory motion to the laundry articles.

To transmit power to the agitator, some washing machine appliances include a direct drive configuration. However, such configurations are generally more expensive as a larger, more complex motor is generally required for direct drive configurations. Thus, some washing machine appliances include transmissions that include smaller, less expensive motors with a gear train that provides a gear reduction. Many times, spur gears are used in the gear train. However, spur gears are relatively noisy and generate a "clicking" noise when their rotation direction is reversed. Consumers generally prefer washing machine appliances that operate quietly.

Accordingly, a washing machine appliance that addresses one or more of the challenges noted above would be desirable.

BRIEF DESCRIPTION OF THE INVENTION

Aspects and advantages of the invention will be set forth in part in the following description, or may be apparent from the description, or may be learned through practice of the invention.

In one exemplary embodiment, a washing machine appliance is provided. The washing machine appliance includes a cabinet, a wash tub disposed within the cabinet, and a wash basket rotatably mounted within the wash tub, the wash basket configured for receipt of laundry articles. The washing machine appliance includes an agitation element positioned within the wash basket and configured for imparting motion to laundry articles within the wash basket. Further, the washing machine appliance includes a torque source for selectively rotating one or both of the wash basket and the agitation element about an axis of rotation. Moreover, the washing machine appliance includes a wash basket drive element coupled to the wash basket and selectively connectable with the torque source for selective rotation about the axis of rotation. Moreover, the washing machine appliance includes an input shaft coupled to the torque source and rotatable about the axis of rotation when driven by the torque source. Further, the washing machine appliance includes a sun gear attached to or integrally formed with the input shaft, the sun gear having a plurality of helical teeth. Moreover, the washing machine appliance includes a ring gear annularly disposed about the axis of rotation and connected to the wash basket drive element, the ring gear having a plurality of helical teeth. In addition, the washing machine appliance includes a first bearing coupling the input shaft with the wash basket drive element. The washing machine appliance also includes a carrier rotatable about the axis of rotation. Moreover, the washing machine appliance includes one or more planetary gears supported by the carrier, each of the one more planetary gears having a plurality of helical teeth, the one or more planetary gears in meshing engagement with the sun gear and the ring gear and each of the one or more planetary gears configured to rotate about a rotation axis and revolve about the sun gear for driving the carrier about the axis of rotation. In addition, the washing machine appliance includes an output shaft connected to the carrier and rotatable about the axis of rotation when driven by the carrier, the output shaft coupled with the agitation element for driving the agitation element about the axis of rotation. Further, the washing machine appliance includes a second bearing coupling the output shaft with the wash basket drive element.

In another exemplary embodiment, a vertical axis washing machine appliance is provided. The vertical axis washing machine appliance includes a cabinet, a wash tub disposed within the cabinet, and a wash basket rotatably mounted within the wash tub, the wash basket configured for receipt of laundry articles. Further, the vertical axis washing machine appliance includes an agitation element extending at least partially into the wash basket and configured for imparting motion to laundry articles within the wash basket. Moreover, the vertical axis washing machine appliance includes a torque source for selectively rotating one or both of the wash basket and the agitation element about an axis of rotation. Furthermore, the vertical axis washing machine appliance includes a wash basket drive element selectively connectable with the torque source for selective rotation about the axis of rotation. In addition, the vertical axis washing machine appliance includes an input shaft coupled to the torque source and rotatable about the axis of rotation when driven by the torque source. The vertical axis washing machine appliance also includes a sun gear attached to or integrally formed with the input shaft, the sun gear having a plurality of helical teeth. The vertical axis washing machine appliance also includes a ring gear annularly disposed about the axis of rotation and connected to the wash basket drive element, the ring gear having a plurality of helical teeth. In addition, the vertical axis washing machine appliance includes a first ball bearing coupling the input shaft with the wash basket drive element, wherein the input shaft is press fit into the first ball bearing and the first ball bearing is press fit into the wash basket drive element. Moreover, the vertical axis washing machine appliance includes a carrier rotatable about the axis of rotation. The vertical axis washing machine appliance includes one or more planetary gears supported by the carrier, each of the one more planetary gears having a plurality of helical teeth, the one or more planetary gears in meshing engagement with the sun gear and the ring gear and each of the one or more planetary gears configured to rotate about a rotation axis and revolve about the sun gear for driving the carrier about the axis of rotation. The vertical axis washing machine appliance also includes an output shaft connected to the carrier and rotatable about the axis of rotation when driven by the carrier, the output shaft coupled with the agitation element for driving the agitation element about the axis of rotation. In addition, the vertical axis washing machine appliance includes a second ball bearing coupling the output shaft with the wash basket drive element, wherein the output shaft is press fit into the second ball bearing and the second ball bearing is press fit into the wash basket drive element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 10, 11, 12, and 13 provide various views of an exemplary bowed e-ring for a transmission assembly according to an exemplary embodiment of the present disclosure.

DETAILED DESCRIPTION OF THE INVENTION

Figure 1:
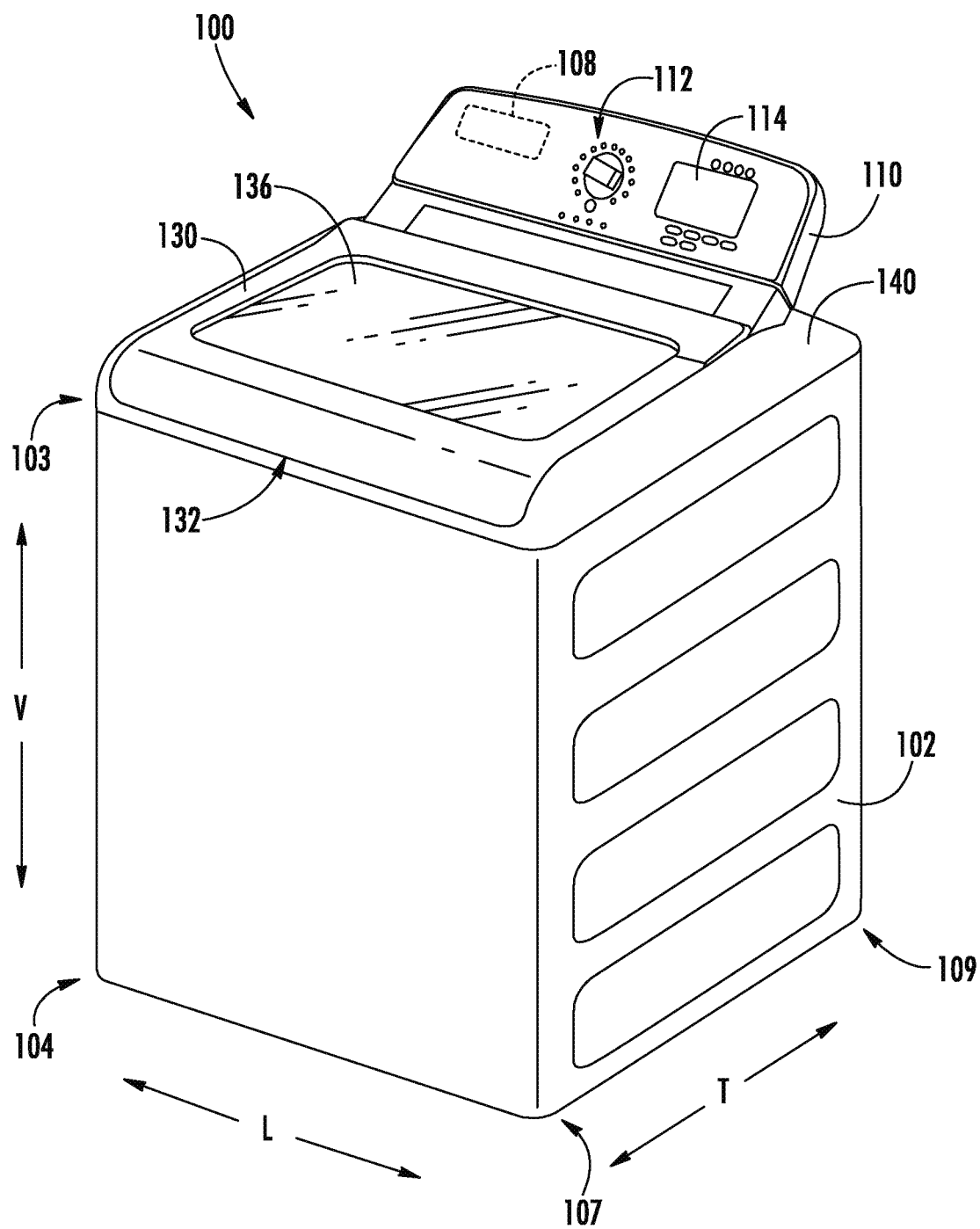
FIG. 1 provides a perspective view of a washing machine appliance according to an exemplary embodiment of the present disclosure with a door of the exemplary washing machine appliance shown in a closed position.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error.

Figure 2:
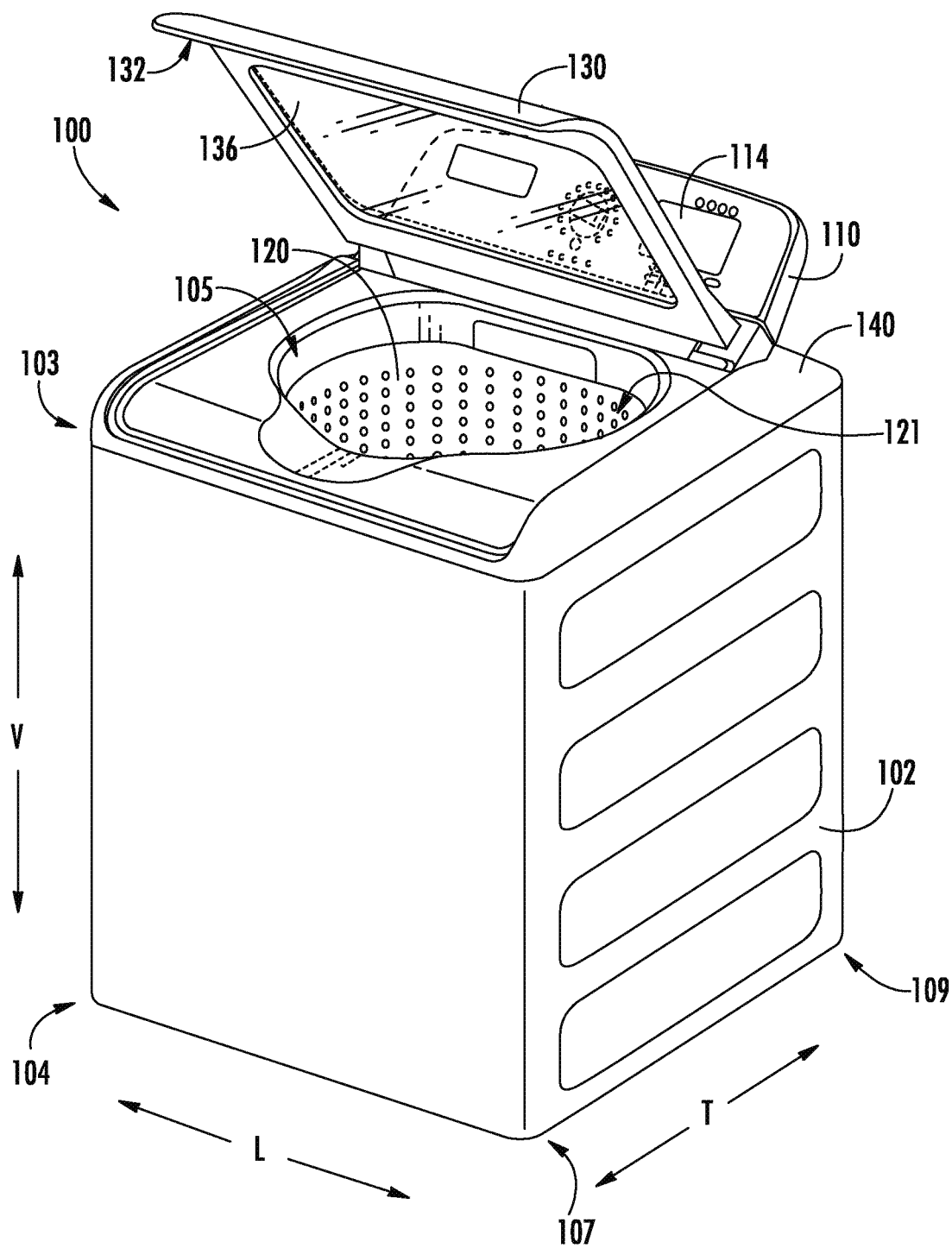
FIG. 2 provides a perspective view of the exemplary washing machine appliance of FIG. 1 with the door of the washing machine appliance shown in an open position.
Figure 3:
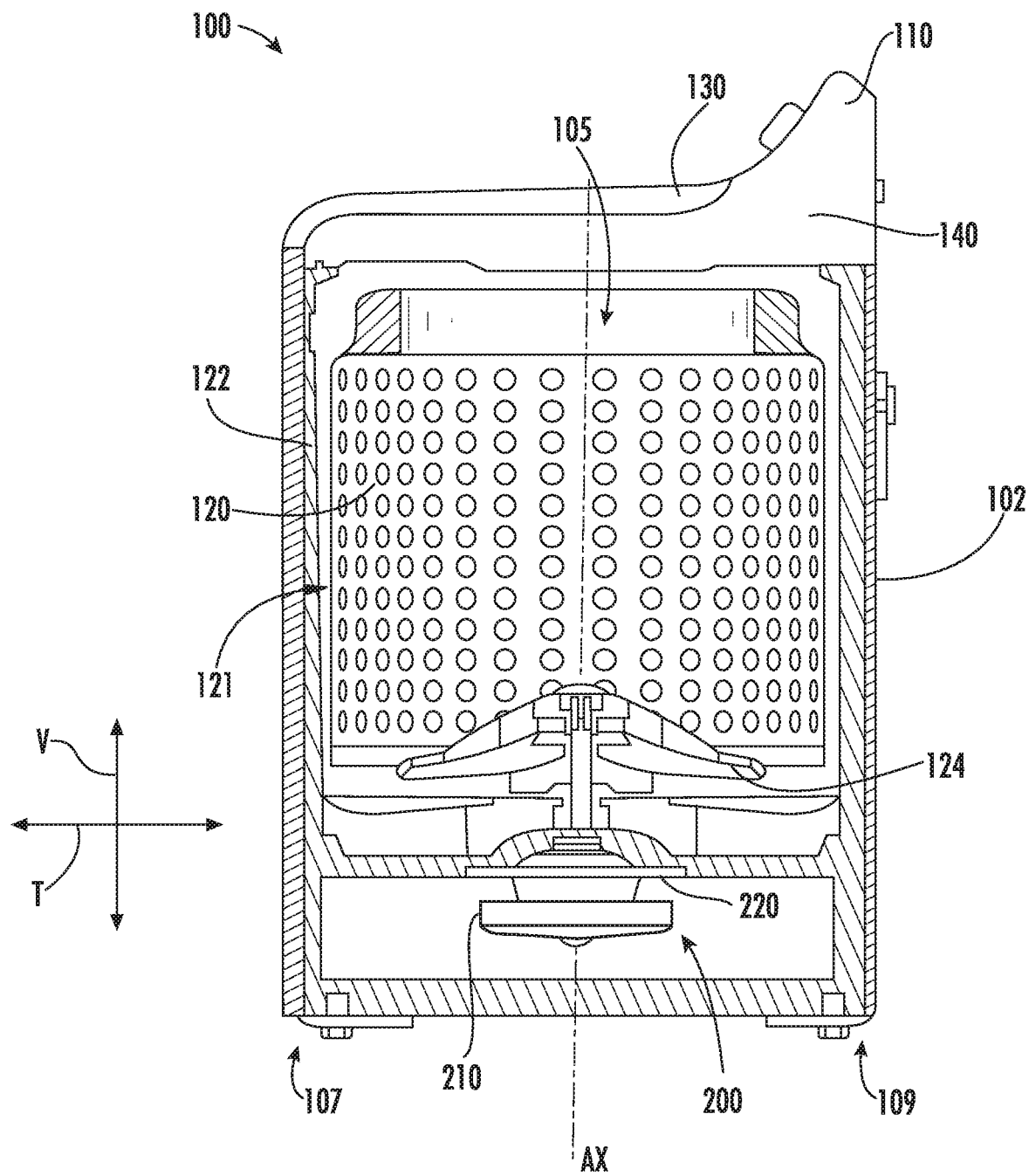
FIG. 3 provides a side cross sectional view of the washing machine appliance of FIG. 1.

FIGS. 1, 2, and 3 illustrate one exemplary vertical axis washing machine appliance 100 in which aspects of the present disclosure may be incorporated. In FIG. 1, a lid or door 130 of washing machine appliance 100 is shown in a closed position. In FIG. 2, door 130 is shown in an open position. FIG. 3 provides a side cross-sectional view of washing machine appliance 100. As shown, washing machine appliance 100 defines a vertical direction V, a lateral direction L, and a transverse direction T, each of which is mutually perpendicular such that an orthogonal coordinate system is defined.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the teachings of the present disclosure as well.

As shown in FIGS. 1 through 3, washing machine appliance 100 has a cabinet 102 that extends between a top portion 103 and a bottom portion 104 (FIGS. 1 and 2), e.g., along the vertical direction V, between a front 107 and a back 109, e.g., along the transverse direction T, and between a first side and a second side, e.g., along the lateral direction L. A wash basket 120 (FIGS. 2 and 3) is rotatably mounted within cabinet 102. A drive assembly 200 (FIG. 3) of washing machine appliance 100 is configured to selectively drive or rotate wash basket 120. Drive assembly 200 includes a torque source, or a permanent magnet synchronous motor 210 (FIG. 3) in this embodiment. Motor 210 is selectively in mechanical communication with wash basket 120 to rotate wash basket 120 about an axis of rotation (e.g., during an agitation cycle of washing machine appliance 100). Wash basket 120 is received within a wash chamber 121 (FIGS. 2 and 3) defined by a wash tub 122 (FIG. 3) positioned within cabinet 102. Wash basket 120 is configured for receipt of articles for washing. Tub 122 holds wash and rinse fluids for agitation in wash basket 120 within wash chamber 121. Wash basket 120 defines a plurality of perforations to facilitate fluid communication between an interior of wash basket 120 and tub 122.

An agitation element 124 (FIG. 3) extends into wash basket 120. Agitation element 124 may be any suitable type of agitator, including for example, a vane agitator, impeller, auger, or oscillatory basket mechanism, or some combination thereof. Agitation element 124 facilitates agitation of articles disposed within wash basket 120, e.g., during an agitation cycle of washing machine appliance 100. Particularly, agitation element 124 imparts an oscillatory motion to articles and liquid in wash basket 120. As illustrated in FIG. 3, agitation element 124 and wash basket 120 are oriented to rotate about an axis of rotation AX (which is substantially parallel to vertical direction V in this embodiment). Wash basket 120 and agitation element 124 are driven by motor 210 of drive assembly 200, which operates to turn or rotate agitation element 124, and in some modes of operation wash basket 120, within tub 122 as will be more fully described below.

Cabinet 102 of washing machine appliance 100 has a top panel 140. Top panel 140 defines an opening 105 (FIG. 2) that permits user access to wash basket 120 of chamber 121. Door 130, rotatably mounted to top panel 140, permits selective access to opening 105; in particular, door 130 selectively rotates between the closed position shown in FIG. 1 and the open position shown in FIG. 2. In the closed position, door 130 inhibits access to wash basket 120. Conversely, in the open position, a user can access wash basket 120. A window 136 in door 130 permits viewing of wash basket 120 when door 130 is in the closed position, e.g., during operation of washing machine appliance 100. Door 130 also includes a handle 132 that, e.g., a user may pull and/or lift when opening and closing door 130. Further, although door 130 is illustrated as mounted to top panel 140, alternatively, door 130 may be mounted to cabinet 102 or any other suitable support member.

A control panel 110 with at least one input selector 112 (FIG. 1) is coupled with a backsplash extending from top panel 140. Control panel 110 and input selectors 112 collectively form a user interface for operator selection of machine cycles and features. A display 114 of control panel 110 indicates selected features, operation mode, a countdown timer, and/or other items of interest to appliance users regarding operation.

Operation of washing machine appliance 100 is controlled by a controller or processing device 108 (FIG. 1) that is operatively coupled to control panel 110 for user manipulation to select washing machine cycles and features. In response to user manipulation of control panel 110, controller 108 operates the various components of washing machine appliance 100 to execute selected machine cycles and features.

Controller 108 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 108 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 110 and other components of washing machine appliance 100 may be in communication with controller 108 via one or more signal lines or shared communication busses.

Washing machine appliance 100 may be operated in the following exemplary manner. Laundry articles are loaded into wash basket 120 through opening 105, and washing operation is initiated through operator manipulation of input selectors 112 of control panel 110. Tub 122 and wash basket 120 are filled with water and detergent and/or other fluid additives. One or more valves can be controlled by washing machine appliance 100 to provide for filling wash basket 120 to the appropriate level for the amount of articles being washed and/or rinsed.

For a wash cycle, the contents within wash basket 120 are agitated with agitation element 124 for cleansing of laundry items in wash basket 120. More specifically, agitation element 124 is moved back and forth in an oscillatory back-and-forth motion. Particularly, agitation element 124 is rotated clockwise a specified amount about the axis of rotation AX, which in this embodiment is a vertical axis, and then rotated counterclockwise by a specified amount about the axis of rotation AX. The clockwise/counterclockwise reciprocating motion is sometimes referred to as a stroke, and the agitation phase of the wash cycle constitutes a number of strokes in sequence. Acceleration and deceleration of agitation element 124 during the strokes imparts mechanical energy to articles in wash basket 120 for cleansing action. The strokes may be obtained in different embodiments with a reversing motor, a reversible clutch, or other known reciprocating mechanism.

After the agitation phase of the wash cycle is completed, wash basket 120 can be drained with a pump assembly. The laundry articles can then be rinsed by again adding fluid to wash basket 120 depending on the specifics of the cleaning cycle selected by a user. Agitation element 124 may again provide agitation within wash basket 120. One or more spin cycles may also be used. In particular, a spin cycle may be applied after the wash cycle and/or after the rinse cycle to wring wash fluid from the articles being washed. During a spin cycle, wash basket 120 is rotated at relatively high speeds. After articles disposed in wash basket 120 are cleaned and/or washed, the user can remove the laundry articles from wash basket 120, e.g., by reaching into wash basket 120 through opening 105.

Figure 4:
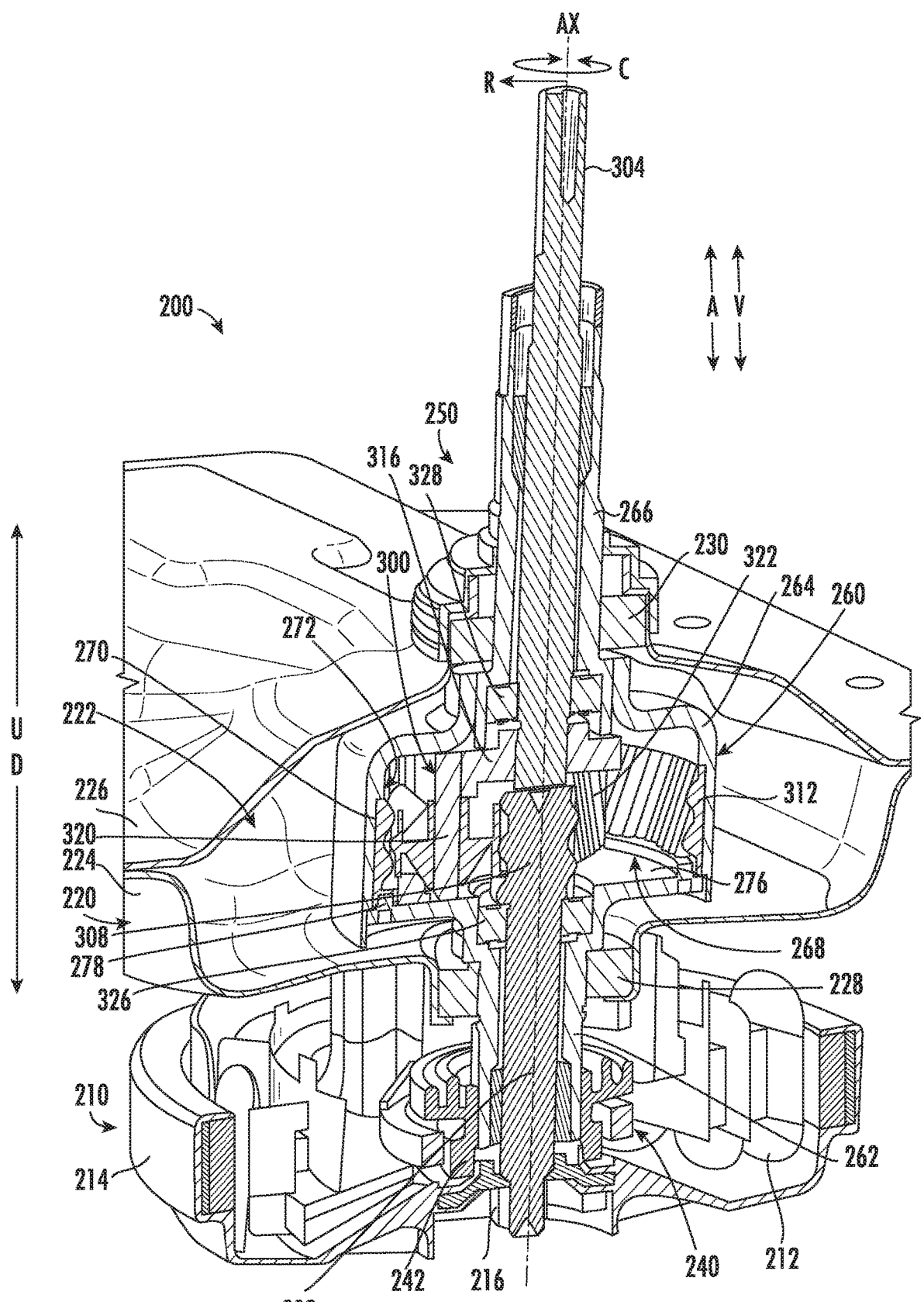
FIG. 4 provides a perspective, cross sectional view of an exemplary drive assembly in accordance with an exemplary embodiment of the present disclosure.
Figure 5:
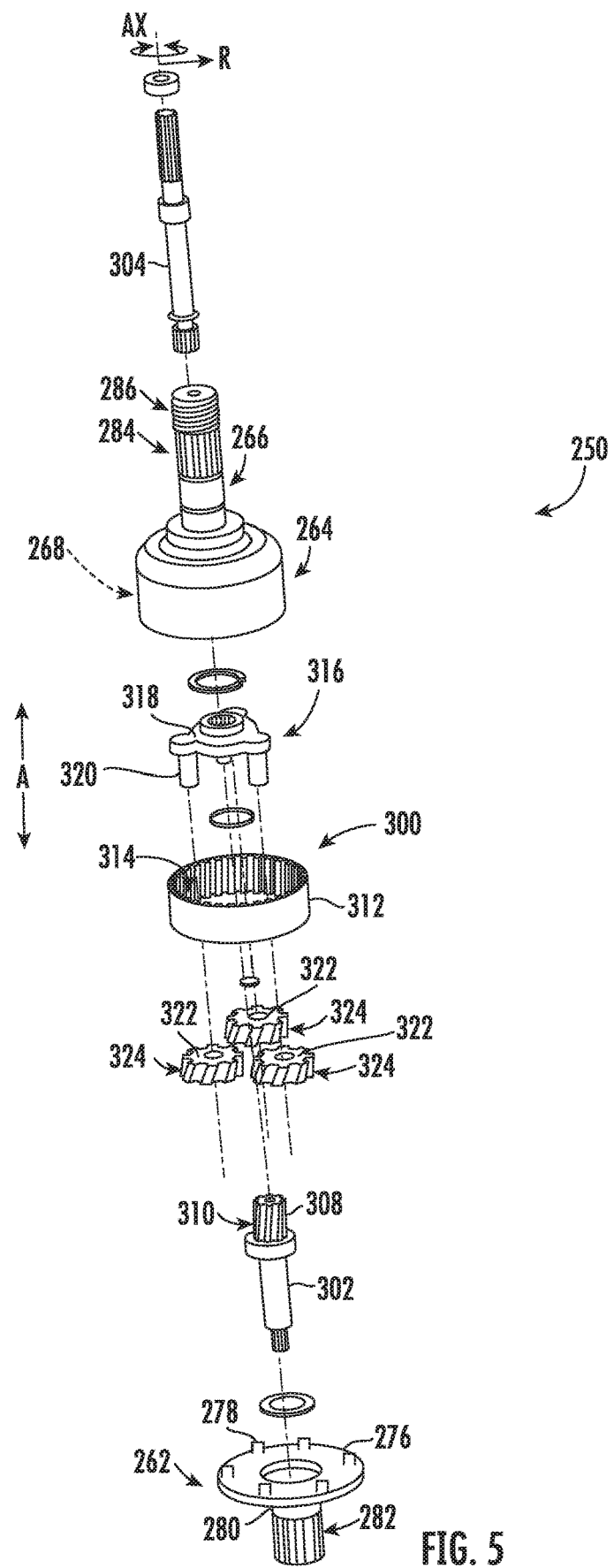
FIG. 5 provides an exploded view of a transmission assembly of the drive assembly of FIG. 4.
Figure 6:
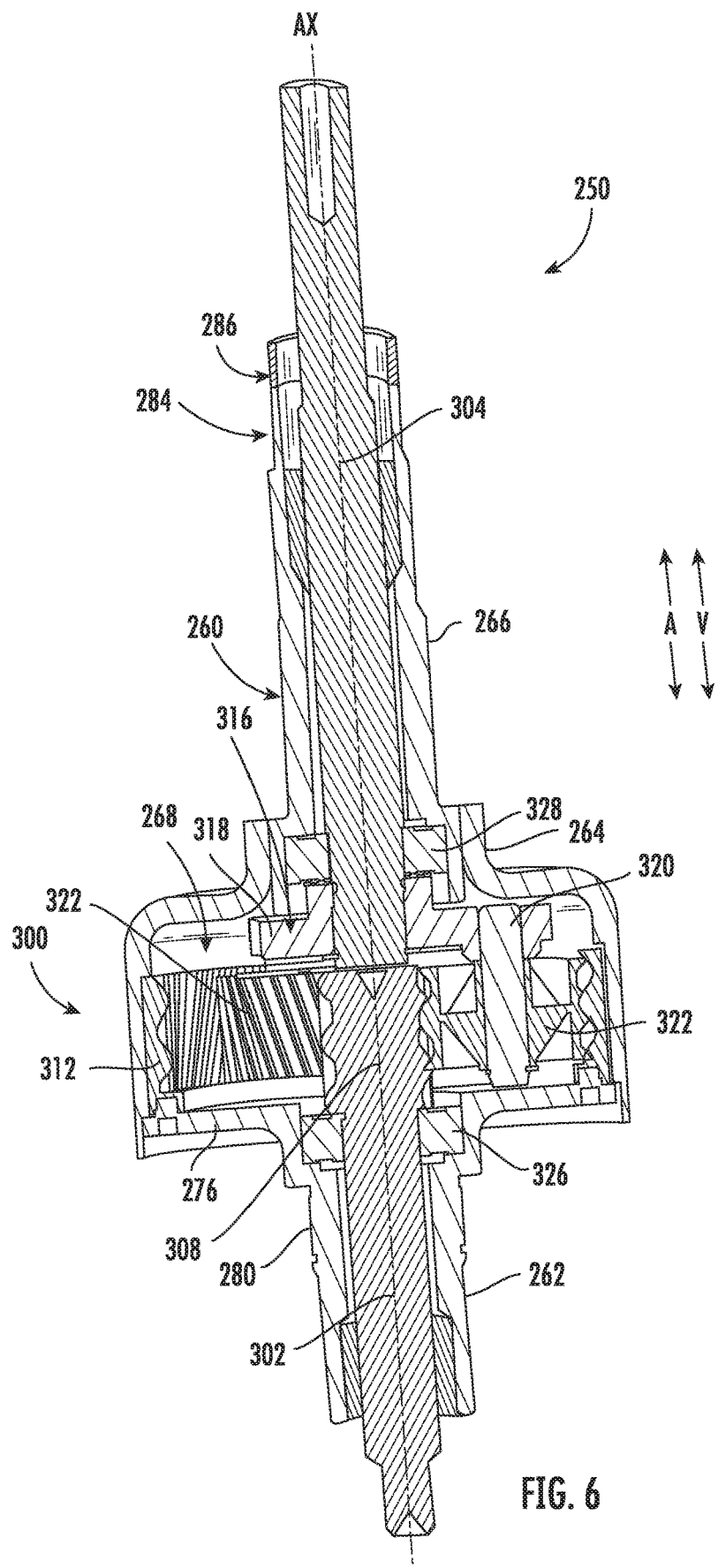
FIG. 6 provides a perspective, cross sectional view of the transmission assembly of FIG. 5 depicted in an assembled state.
Figure 7:
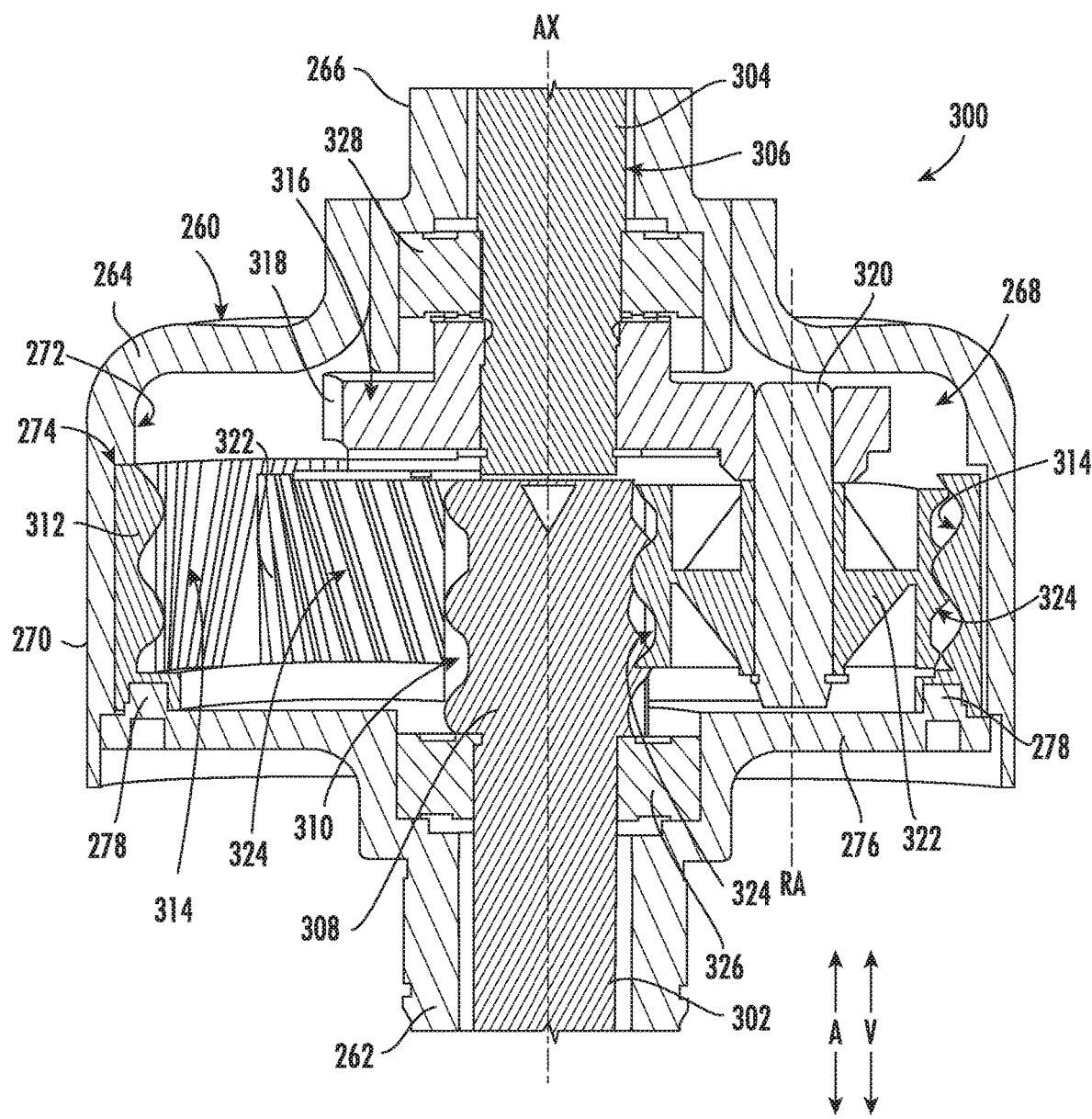
FIG. 7 provides a close up, cross sectional view of a planetary helical gear drive of the transmission assembly of FIG. 6.

FIGS. 4, 5, 6, and 7 provide various views of an exemplary drive assembly 200 in accordance with exemplary embodiments of the present disclosure. For instance, drive assembly 200 may be the drive assembly of washing machine appliance 100 of FIGS. 1 through 3 and thus drive assembly 200 will be described in in the context of washing machine appliance 100. However, it will be appreciated that drive assembly 200 of FIGS. 4 through 7 may be incorporated into other suitable washing machine appliances. FIG. 4 provides a perspective, cross sectional view of drive assembly 200 configured for selectively driving or rotating wash basket 120 and/or agitation element 124 about the axis of rotation AX, which in this embodiment is a vertical axis of rotation that extends along or substantially along the vertical direction V. FIG. 5 provides an exploded view of a transmission assembly 250 of drive assembly 200. FIG. 6 provides a perspective, cross sectional view of transmission assembly 250. FIG. 7 provides a close up view of transmission assembly 250. For reference, drive assembly 200 defines an axial direction A (which extends along the vertical direction V in this embodiment), a radial direction R extending to and from the axis of rotation AX in a direction orthogonal to the axial direction A, and a circumferential direction C extending three hundred sixty degrees (360°) about the axis of rotation AX.

Generally, with reference to FIG. 4, drive assembly 200 includes a torque source. For this embodiment, the torque source is electric drive or motor 210. Motor 210 is configured for converting electrical energy into mechanical energy, e.g., to drivingly rotate various components of washing machine appliance 100. Further, drive assembly 200 includes a mode shifting assembly 240 for shifting washing machine appliance 100 between modes of operation (e.g., between a wash cycle and a spin cycle). Moreover, drive assembly 200 includes transmission assembly 250. Transmission assembly 250 is configured to transmit mechanical power generated by motor 210 to agitation element 124 and selectively to wash basket 120 (FIG. 3).

The torque source or electric motor 210 includes a stator 212 and a rotor 214. When energized with the appropriate electrical power, rotor 214 rotates while stator 212 remains fixed. Motor 210 may be any suitable type of electric motor or drive. For instance, for this embodiment, motor 210 is a brushless direct current electric motor (BLDC). Moreover, for this embodiment, rotor 214 is positioned outward of stator 212 along the radial direction R. As further illustrated in FIG. 4, rotor 214 is coupled with or attached to an input shaft 302 of transmission assembly 250 via coupling 216. Stator 212 is attached to a support housing 220 that supports drive assembly 200 during various cycles or modes of operation of washing machine appliance 100 (e.g., a spin cycle). More specifically, stator 212 is attached to a lower shell 224 of support housing 220. Lower shell 224 is attached to an upper shell 226 of support housing 220. Support housing 220, and particularly upper shell 226 of support housing 220, is attached to or coupled with a bottom wall of tub 122 (FIG. 3). Support housing 220 may be formed of sheet metal or another suitable material. Support housing 220 defines a cavity 222 in which at least a portion of certain components of transmission assembly 250 are received as will be further described.

As shown best in FIGS. 5 and 6, transmission assembly 250 includes a wash basket drive element 260 (FIG. 6) coupled to wash basket 120 (FIG. 3) and selectively connectable with motor 210 for selective rotation about the axis of rotation AX. For this embodiment, wash basket drive element 260 is collectively formed by a lower spin tube 262, a main spin tube 264, and an upper spin tube 266. Generally, lower spin tube 262 is coupled with or connected to main spin tube 264 at a bottom of main spin tube 264 and upper spin tube 266 is coupled with or connected to main spin tube 264 at a top of main spin tube 264. The separate tubes 262, 264, 266 of wash basket drive element 260 facilitate ease of assembly of transmission assembly 250. However, in some embodiments, lower spin tube 262, main spin tube 264, and upper spin tube 266 are formed as a single, monolithic component, e.g., by a molding or an additive manufacturing process. In other embodiments, main spin tube 264 and upper spin tube 266 are formed as a single, monolithic component. Further, in yet other embodiments, main spin tube 264 and lower spin tube 262 are formed as a single, monolithic component.

Lower spin tube 262 is concentric with input shaft 302 and surrounds at least a portion of input shaft 302 (as best shown in FIG. 6). Notably, lower spin tube 262 has a splined shaft 280 that has a plurality of spline teeth 282 (FIG. 5) defined by the outer diameter of the shaft. The spline teeth 282 are oriented along the axial direction A, which is also the vertical direction V in this embodiment. As depicted, spline teeth 282 need not extend along the entire axial length of splined shaft 280. Lower spin tube 262 also includes a flange 276 that extends annularly about the axis of rotation AX. Flange 276 generally extends in a plane orthogonal to the axial direction A. Lower spin tube 262 is coupled with or connected to main spin tube 264, as noted above. Particularly, flange 276 of lower spin tube 262 is connected to main spin tube 264. Main spin tube 264 generally encases various components of transmission assembly 250 as will be described further below. A top end of main spin tube 264 is coupled with or connected to upper spin tube 266. Upper spin tube 266 is concentric with an output shaft 304 of transmission assembly 250 and surrounds at least a portion of output shaft 304 (as best shown in FIG. 6).

Notably, upper spin tube 266 has a plurality of spline teeth 284 defined by the outer diameter of upper spin tube 266 and a threaded portion 286 disposed axially (or vertically) above spline teeth 284. Wash basket 120 (FIGS. 2 and 3) may include complementary spline teeth and a threaded portion to connect to upper spin tube 266. In this way, when wash basket drive element 260 is driven about the axis of rotation AX, wash basket drive element 260 applies torque to wash basket 120 to rotatably drive wash basket 120 about the axis of rotation AX, e.g., during a spin cycle.

As shown best in FIG. 4, to selectively control the rotation of wash basket 120, a clutch 242 of mode shifting assembly 240 is used to engage and disengage wash basket drive element 260 from rotor 214. In this way, a mode of operation of washing machine appliance 100 may be shifted. Clutch 242 is movable between an engaged position and a disengaged position, e.g., by a mode shifter arm (not shown). In FIG. 4, clutch 242 is shown in an engaged position in which wash basket drive element 260 is engaged with rotor 214 such that wash basket 120 and agitation element 124 (FIG. 3) are rotated simultaneously by rotor 214 of motor 210. To shift modes of washing machine appliance 100, clutch 242 can be shifted upward (arrow U in FIG. 4), e.g., by a mode shifter arm, to a disengaged position in which wash basket drive element 260 is disengaged or disconnected from rotor 214 such that the rotation of wash basket 120 is prevented while agitation element 124 is rotated about the axis of rotation AX (e.g., during wash and rinse cycles). When clutch 242 is in the disengaged position, input shaft 302 is configured to be driven by torque source (motor 210) about the axis of rotation AX in a first rotation direction (e.g., a clockwise direction) and a second rotation direction (e.g., a counterclockwise direction) to impart oscillatory motion to laundry articles within wash basket 120. To return to the engaged position, clutch 242 can be shifted downward (arrow D in FIG. 4).

When wash basket drive element 260 is rotated about the axis of rotation AX to drive wash basket 120, e.g. in a spin cycle, wash basket drive element 260 rotates within lower and upper shells 224, 226 of support housing 220. Wash basket drive element 260 is mounted to and supported by support housing 220. Particulalry, upper spin tube 266 of wash basket drive element 260 is rotatably mounted to support housing 220 by an upper bearing 230 and lower spin tube 262 is rotatably mounted to support housing 220 by a lower bearing 228. Lower and upper bearings 228, 230 may be ball bearings, for example. As noted above, in some modes of operation, the position of wash basket drive element 260 can be fixed to hold wash basket 120 stationary while agitation element 124 is oscillated during e.g., a wash or rinse cycle. In some modes of operation, as noted above, wash basket drive element 260 can also be rotated with agitation element 124, e.g., during a spin cycle.

Transmission assembly 250 also includes a planetary helical gear reduction unit or planetary helical gear train 300. As shown in FIG. 4, planetary helical gear train 300 of transmission assembly 250 includes input shaft 302 that is operatively coupled with rotor 214 of motor 210 at its bottom end, e.g., via coupling 216. Input shaft 302 includes a sun gear 308 attached to or integrally formed with input shaft 302 at its top end. As shown in FIG. 5, sun gear 308 is a helical sun gear, and thus, sun gear 308 has a plurality of helical teeth 310.

With reference to FIGS. 5, 6, and 7, planetary helical gear train 300 also includes one or more planetary gears 322 supported or carried by a carrier 316. For this embodiment, transmission assembly 250 includes three (3) planetary gears 322 each of which are helical planetary gears having helical teeth 324. The helical teeth 324 of each of the planetary gears 322 have the same helical angle as the helical teeth 310 of sun gear 308, but with an opposite helical hand. In this way, the helical teeth 324 of the planetary gears 322 are complementary to the helical teeth 310 of sun gear 308. The one more planetary gears 322 are in meshing engagement with sun gear 308 (shown best in FIG. 7). When power is transmitted from sun gear 308 of input shaft 302 to the planetary gears 322, the planetary gears 322 revolve about sun gear 308 and rotate about their respective rotation axes RA (FIG. 7). In this embodiment, the rotation axes RA of the planetary gears 322 are defined by carrier pins 320 of carrier 316. Carrier 316 includes a body 318 and one or more pins 320 extending from body 318. As noted above, each pin 320 defines a rotation axis RA associated with one of the planetary gears 322.

Planetary helical gear train 300 of transmission assembly 250 also includes an annular ring gear 312 coupled to wash basket drive element 260, and more particularly, to main spin tube 264 of wash basket drive element 260. As shown best in FIG. 7, main spin tube 264 has a sidewall 270 having an inner surface 272 defining a recess 274. Further, flange 276 has a plurality of projections 278 extending therefrom (see also FIG. 5). As shown in FIG. 7, ring gear 312 is embedded in recess 274 of inner surface 272 and receives projections 278 extending from flange 276. For this embodiment, ring gear 312 is concentrically aligned with the axis of rotation AX and is connected to an inner surface 272 of a sidewall 270 of main spin tube 264. That is, ring gear 312 extends annularly about an outer periphery of a transmission chamber 268 defined by main spin tube 264. Like sun gear 308 and planetary gears 322, ring gear 312 has a plurality of helical teeth 314. The helical teeth 314 of ring gear 312 have the same helical angle as the helical teeth 324 of each of the planetary gears 322, but with an opposite helical hand. In this way, the helical teeth 314 of ring gear 312 are complementary to the helical teeth 324 of planetary gears 322. Ring gear 312 is in meshing engagement with the one more planetary gears 322. When power is transmitted from sun gear 308 of input shaft 302 to the planetary gears 322, the planetary gears 322 revolve about sun gear 308 and rotate about their respective rotation axes RA between sun gear 308 and ring gear 312. Ring gear 312 facilitates movement of the planetary gears 322 about sun gear 308. Sun gear 308, planetary gears 322, and ring gear 312 are disposed within transmission chamber 268 defined by main spin tube 264.

Further, planetary helical gear train 300 of transmission assembly 250 includes output shaft 304 connected to carrier 316. Output shaft 304 is rotatable about the axis of rotation AX when driven by carrier 316, e.g., when carrier 316 is driven by planetary gears 322. For this embodiment, output shaft 304 and carrier 316 are connected via complementary splines. In some alternative embodiments, however, output shaft 304 is press fit into a shaft opening defined by body 318 of carrier 316. Moreover, output shaft 304 is coupled with agitation element 124 (FIG. 3) for driving agitation element 124 about the axis of rotation AX. Output shaft 304 may be connected to agitation element 124 in any suitable manner, e.g., by complementary splines. As will be appreciated, output shaft 304 may rotate about the axis of rotation AX at a slower speed relative to input shaft 302.

As shown best in FIGS. 6 and 7, transmission assembly 250 also includes a first bearing 326 and a second bearing 328. First bearing 326 couples input shaft 302 with wash basket drive element 260. More particularly, for this embodiment, first bearing 326 couples input shaft 302 with lower spin tube 262 of wash basket drive element 260. First bearing 326 includes an inner race connected to input shaft 302 and an outer race connected to lower spin tube 262. A plurality of bearing elements are disposed between the inner and outer race and allow for relative motion between input shaft 302 and lower spin tube 262 of wash basket drive element 260. For this exemplary embodiment, the bearing elements of first bearing 326 are ball or spherical bearing elements. In alternative embodiments, other bearing elements may be utilized, such as e.g., roller bearing elements.

Similarly, second bearing 328 couples output shaft 304 with wash basket drive element 260. More particularly, for this embodiment, second bearing 328 couples output shaft 304 with upper spin tube 266 of wash basket drive element 260. Like first bearing 326, second bearing 328 includes an inner race connected to output shaft 304 and an outer race connected to upper spin tube 266. A plurality of bearing elements are disposed between the inner and outer race of second bearing 328 and allow for relative motion between output shaft 304 and upper spin tube 266 of wash basket drive element 260. Moreover, for this embodiment, the bearing elements of second bearing 328 are ball or spherical bearing elements. In alternative embodiments, other bearing elements may be utilized, such as e.g., roller bearing elements.

By coupling input shaft 302 and wash basket drive element 260 with first bearing 326, e.g., vertically below planetary helical gear train 300, and by coupling output shaft 304 and wash basket drive element 260 with second bearing 328, e.g., vertically above planetary helical gear train 300, the axial thrust loads generated by planetary helical gear train 300 are absorbed. More specifically, first bearing 326 absorbs the axial thrust loads generated by planetary helical gear train 300 when input shaft 302 is driven in a first rotation direction about the axis of rotation AX, e.g., along the circumferential direction C, and when the rotation direction of input shaft 302 is reversed to create the desired agitation stroke, second bearing 328 absorbs the axial thrust loads generated by planetary helical gear train 300 when input shaft 302 is driven in a second rotation direction about the axis of rotation AX, e.g., along the circumferential direction C. The second rotation direction is a direction opposite the first rotation direction. In addition to absorbing the axial thrust loads, first and second bearings 326, 328 also prevent shuttling of the gears.

Further, in some exemplary embodiments, input shaft 302 is press fit into first bearing 326 and first bearing 326 is press fit into wash basket drive element 260. More particularly, first bearing 326 is press fit into lower spin tube 262 of wash basket drive element 260. In some embodiments, a clip may further secure first bearing 326 to lower spin tube 262. Similarly, output shaft 304 is press fit into second bearing 328 and second bearing 328 is press fit into wash basket drive element 260. More specifically, second bearing 328 is press fit into upper spin tube 266 of wash basket drive element 260. In some embodiments, a clip may further secure second bearing 328 to upper spin tube 266. The press fit connections reduces the number of parts of planetary helical gear train 300 and prevents shuttling, i.e., axial movement, of first bearing 326 and second bearing 328.

Notably, first bearing 326 couples input shaft 302 with wash basket drive element 260, or more specifically lower spin tube 262 of wash basket drive element 260, directly below sun gear 308 along the axial direction A, which in this embodiment is the vertical direction V. Moreover, second bearing 328 couples output shaft 304 with the wash basket drive element 260 directly above carrier 316 along the axial direction A, or vertical direction V in this embodiment. In this way, first and second bearings 326, 328 may better absorb the axial thrust loads generated as well as shuttling of the gears.

Moreover, as shown best in FIG. 4, first bearing 326 couples input shaft 302 with lower spin tube 262 above where lower bearing 228 couples support housing 220 with lower spin tube 262 along the axial direction A, or in this embodiment the vertical direction V. Further, second bearing 328 couples output shaft 304 with upper spin tube 266 below where upper bearing 230 couples support housing 220 with upper spin tube 266 along the axial direction A, or in this embodiment the vertical direction V. Such configuration reduces the overall space needed for the design and reduces the overall vibration of the transmission assembly 250 during operation of washing machine appliance 100.

Figure 8:
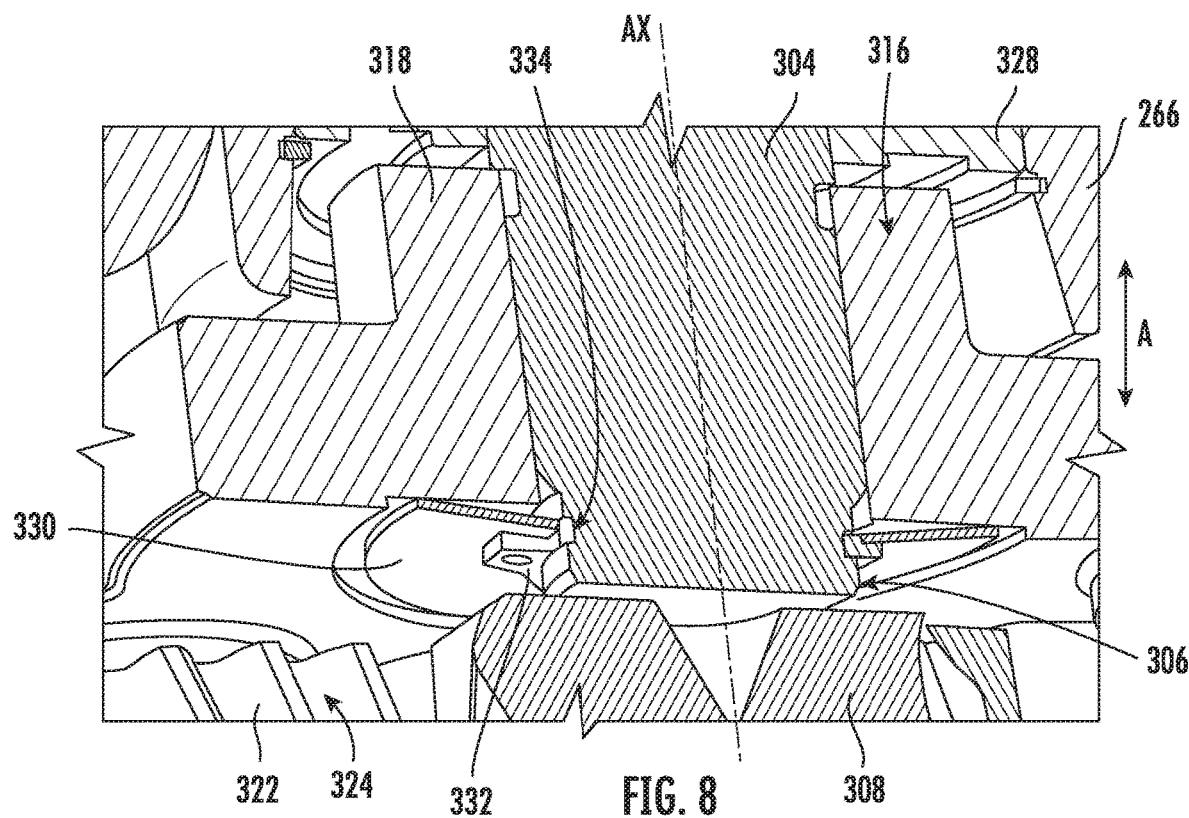
FIG. 8 provides a close up, perspective cross sectional view of an output shaft connected to a carrier of the transmission assembly of FIG. 6.
Figure 9:
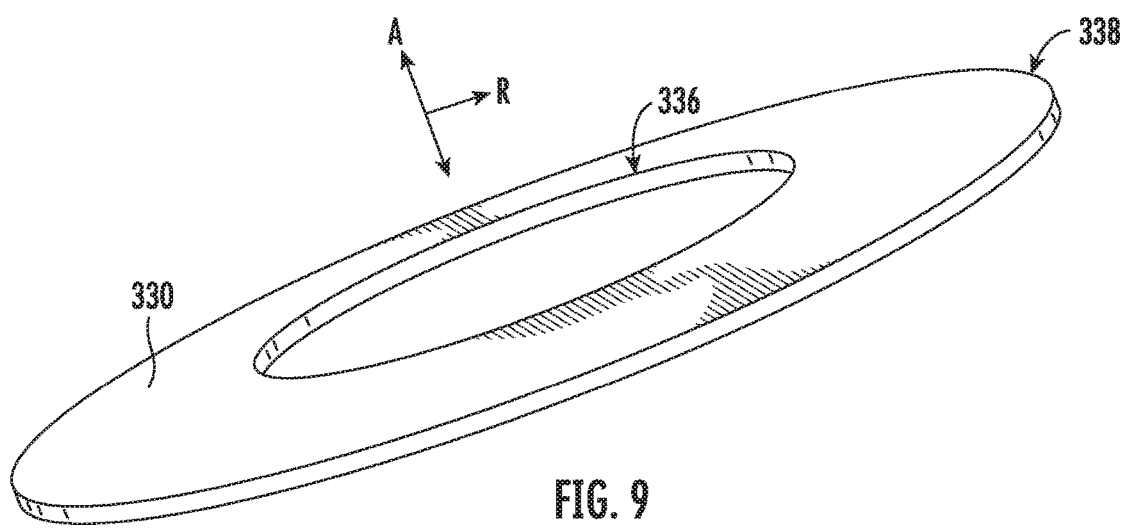
FIG. 9 provides an exemplary spring clip of the transmission assembly depicted in FIG. 8.
Figure 10:
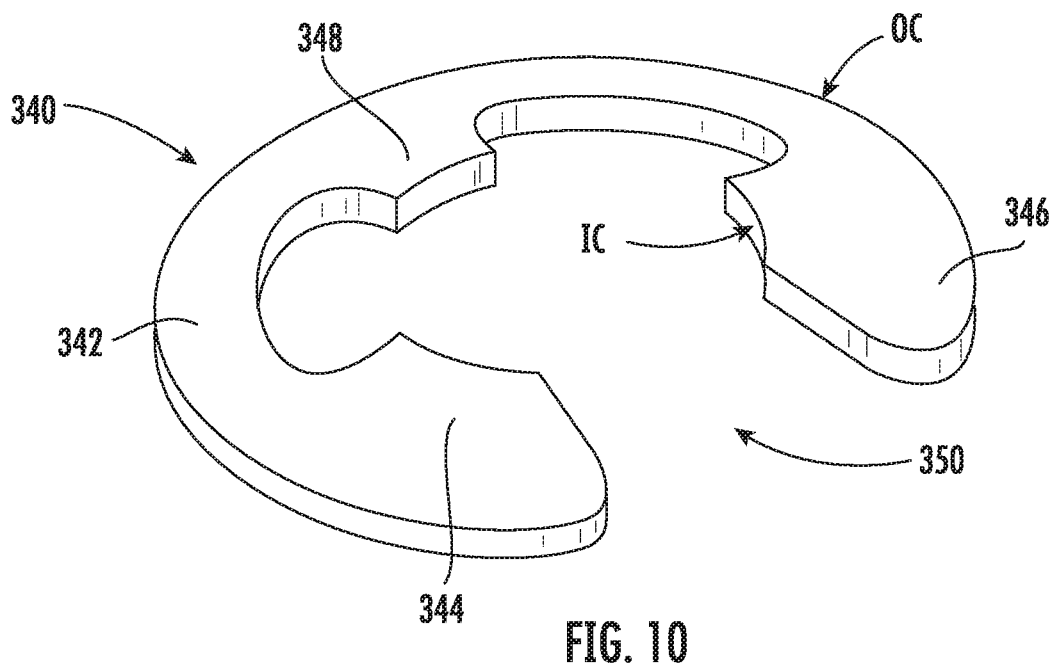
Figure 11:
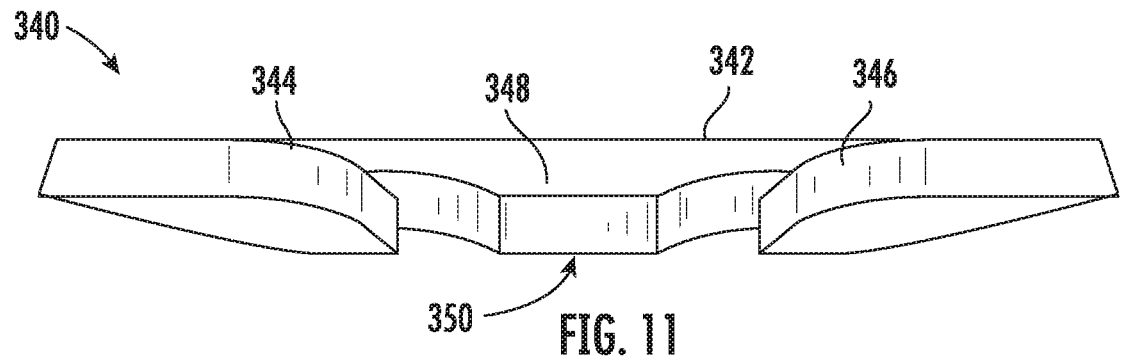
Figure 12:
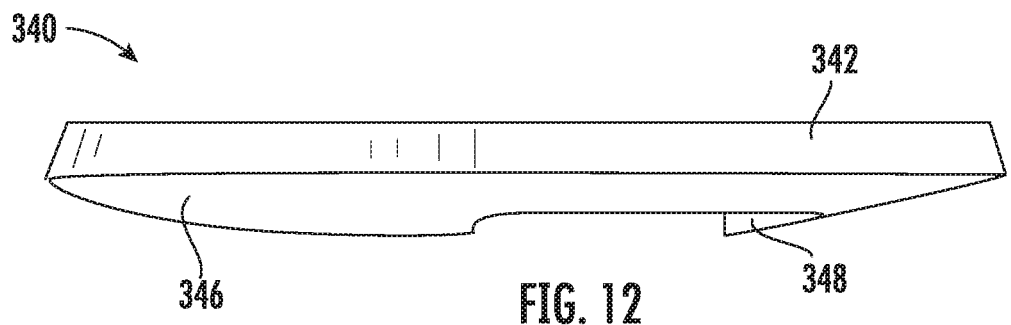

FIG. 8 provides a close up, perspective cross sectional view of output shaft 304 connected to carrier 316 of transmission assembly 250 of FIG. 6. FIG. 9 provides an exemplary spring clip 330 of the transmission assembly 250 of FIG. 8. As shown in FIG. 9, in some embodiments, to hold or secure carrier 316 in place along the axial direction A and to prevent shuttling of carrier 316 along the axial direction A when the rotation direction of output shaft 304 is changed, e.g., during an agitation cycle, transmission assembly 250 includes a C-clip 332 that is at least partially disposed within a recess 334 defined by output shaft 304. Recess 334 is defined by output shaft 304 and extends circumferentially about an outer surface 306 of output shaft 304. Spring clip 330 is disposed between C-clip 332 and body 318 of carrier 316 along the axial direction A, or in this embodiment the vertical direction V. Spring clip 330 biases carrier 316 in position and prevents carrier 316 from shuttling up and down along the axial direction A during operation of washing machine appliance 100. In this way, washing machine appliance 100 may perform operations in a more quiet manner.

More particularly, as shown in FIG. 9, spring clip 330 has an inner rim 336 and an outer periphery 338 spaced radially from inner rim 336. Notably, the body of spring clip 330 slopes downward along the axial direction A from inner rim 336 to outer periphery 338. Thus, inner rim 336 has a higher elevation than outer periphery 338. When forces are applied to carrier 316 (FIG. 8) that tend to move it along the axial direction A, i.e., cause carrier 316 to shuttle, spring clip 330 dampens the axial movement of carrier 316 and prevents carrier 316 from shuttling. The geometry and elastic nature of spring clip 330 facilitates securing carrier 316 in place along the axial direction A.

Referring now to FIGS. 10, 11, 12, and 13, in some embodiments, transmission assembly 250 includes a e-ring 340 to hold or secure carrier 316 in place along the axial direction A and to prevent shuttling of carrier 316 along the axial direction A when the rotation direction of output shaft 304 is changed, e.g., during an agitation cycle. For this embodiment, e-ring 340 is a bowed e-ring. As shown best in FIG. 13, e-ring 340 is at least partially disposed within recess 334 defined by output shaft 304 between carrier 116 and a bottom end 305 of output shaft 304 along the vertical direction V. More particularly, e-ring 340 includes a ring body 342. A first projection 344 and a second projection 346 each project circumferentially from ring body 342 toward one another. First and second projections 344, 346 also project radially inward from ring body 342. An opening 350 is defined between first projection 344 and second projection 346. First and second projections 344, 346 also tilt inward toward one another as shown best in FIG. 11. Further, a base projection 348 projects radially inward from ring body 342 between first and second projections 346, 348. More specifically, base projection 348 projects from ring body 342 midway between first and second projections 346, 348. E-ring 340 has an outer circumference OD and an inner circumference IC. The inner circumference IC is defined by the first, second, and base projections 344, 346, 348.

To mount e-ring 340 to output shaft 304, opening 350 of e-ring 340 is first aligned with annular groove or recess 334 of output shaft 304. First and second projections 344, 346 are then pressed against output shaft 304 within recess 334, which causes first and second projections 344, 346 to resiliently expand outward. When first and second projections 344, 346 expand outward, opening 350 of e-ring 340 is widened. E-ring 340 is slid into and snapped into place within recess 334. When e-ring 340 snaps into place, first projection 344, second projection 346, and base projection 348 clamp output shaft 304 within recess 334. That is, the inner circumference IC of e-ring 340 engages output shaft 304. Thus, e-ring 340 is firmly fitted onto output shaft 304. When e-ring 340 is positioned in place, the bowed construction of e-ring 340 biases carrier 316 upward along the axial direction A (or vertical direction V) and prevents shuttling of carrier 316, e.g., along the axial direction A when the rotation direction of output shaft 304 is changed. In this way, washing machine appliance 100 may perform operations in a more quiet manner.

The exemplary washing machine appliance described herein includes a transmission assembly that has features that manage axial thrust loads created by helical gears of the gear train and prevent shuttling of the gears and other components. More particularly, transmission assembly includes a first bearing, such as e.g., a first ball bearing, that manages the axial load when the torque source drives the input shaft of the transmission assembly in a first rotation direction. When the torque source reverses direction and drives the input shaft in a second rotation direction opposite the first rotation direction, e.g., to generate a predetermined stroke of the agitation element, a second bearing, or second ball bearing, manages the axial loads generated by the helical gears. The helical gears of the gear reduction unit provide for more quiet performance, e.g., compared to a spur gear reduction unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
   a cabinet;
   a wash tub disposed within the cabinet;
   a wash basket rotatably mounted within the wash tub, the wash basket configured for receipt of laundry articles;
   an agitation element rotatable about an axis of rotation, the agitation element being positioned within the wash basket and configured for imparting motion to laundry articles within the wash basket;
   a torque source;
   a wash basket drive element coupled to the wash basket and selectively connectable with the torque source;
   an input shaft coupled to the torque source and rotatable about the axis of rotation when driven by the torque source;
   a sun gear attached to or integrally formed with the input shaft, the sun gear having a plurality of helical teeth;
   a ring gear annularly disposed about the axis of rotation and connected to the wash basket drive element, the ring gear having a plurality of helical teeth;
   a first bearing coupling the input shaft with the wash basket drive element;
   a carrier rotatable about the axis of rotation;
   one or more planetary gears supported by the carrier, each of the one more planetary gears having a plurality of helical teeth, the one or more planetary gears in meshing engagement with the sun gear and the ring gear and each of the one or more planetary gears configured to rotate about a rotation axis and revolve about the sun gear for driving the carrier about the axis of rotation;
an output shaft connected to the carrier and rotatable about the axis of rotation when driven by the carrier, the output shaft coupled with the agitation element for driving the agitation element about the axis of rotation; and
a second bearing coupling the output shaft with the wash basket drive element, and
wherein:
  i) the input shaft is press fit into the first bearing and the first bearing is press fit into the wash basket drive element or
  ii) the output shaft is press fit into the second bearing and the second bearing is press fit into the wash basket drive element.

2. The washing machine appliance of claim 1, wherein the input shaft is press fit into the first bearing and the first bearing is press fit into the wash basket drive element.

3. The washing machine appliance of claim 1, wherein the washing machine appliance defines a vertical direction and the axis of rotation extends substantially along the vertical direction, and wherein the first bearing rotatably couples the input shaft with the wash basket drive element directly below the sun gear along the vertical direction.

4. The washing machine appliance of claim 1, wherein the output shaft is press fit into the second bearing and the second bearing is press fit into the wash basket drive element.

5. The washing machine appliance of claim 1, wherein the washing machine appliance defines a vertical direction and the axis of rotation extends substantially along the vertical direction, and wherein the second bearing rotatably couples the output shaft with the wash basket drive element directly above the carrier along the vertical direction.

6. The washing machine appliance of claim 1, wherein the wash basket drive element comprises a lower spin tube, a main spin tube, and an upper spin tube, and wherein the input shaft is concentric with the lower spin tube, the output shaft is concentric with the upper spin tube, and the sun gear, the one or more planetary gears, and the ring gear are disposed within a transmission chamber defined by the main spin tube.

7. The washing machine appliance of claim 6, wherein the input shaft is press fit into the first bearing and the first bearing is press fit into the lower spin tube of the wash basket drive element and the output shaft is press fit into the second bearing and wherein the second bearing is press fit into the upper spin tube of the wash basket drive element.

8. The washing machine appliance of claim 6, wherein the main spin tube comprises a sidewall having an inner surface defining a recess and the lower spin tube comprises a flange extending in a plane orthogonal to the axis of rotation and having a plurality of projections extending therefrom, and wherein the ring gear is embedded in the recess of the inner surface and receives the plurality of projections extending from the flange.

9. The washing machine appliance of claim 6, wherein the washing machine appliance defines a vertical direction, and wherein the washing machine appliance further comprises:
  a support housing defining a cavity in which the main spin tube of the wash basket drive element is received, the support housing connected to the wash tub;
  a lower bearing coupling the support housing with the lower spin tube; and
  an upper bearing coupling the support housing with the upper spin tube;
  wherein the first bearing couples the input shaft with the lower spin tube above where the lower bearing couples the support housing with the lower spin tube along the vertical direction and wherein the second bearing couples the output shaft with the upper spin tube below where the upper bearing couples the support housing with the upper spin tube along the vertical direction.

10. The washing machine appliance of claim 1, wherein the first bearing and the second bearing are both ball bearings.

11. The washing machine appliance of claim 1, wherein the washing machine appliance defines a vertical direction and the axis of rotation extends substantially along the vertical direction, and wherein the output shaft defines a recess extending circumferentially about an outer diameter of the output shaft, and wherein the washing machine appliance further comprises:
  a c-clip at least partially disposed within the recess; and
  a spring clip at least partially disposed within the recess between the c-clip and the carrier along the vertical direction.

12. The washing machine appliance of claim 1, wherein the carrier comprises a body and one or more pins extending from the body, each pin of the one or more pins defining the rotation axis associated with one of the one or more planetary gears.

13. The washing machine appliance of claim 1, further comprising:
  a clutch configured for shifting a mode of operation of the washing machine appliance, the clutch movable between i) an engaged position in which the clutch connects the torque source and the wash basket drive element so that both the agitation element and the wash basket are rotated by the torque source about the axis of rotation, and ii) a disengaged position in which the clutch disconnects the torque source and the wash basket drive element.

14. The washing machine appliance of claim 13, wherein when the clutch is in the disengaged position, the input shaft is configured to be driven by the torque source about the axis of rotation in a first rotation direction and a second rotation direction to impart oscillatory motion to laundry articles within the wash basket.

15. The washing machine appliance of claim 1, wherein the torque source is an electric motor.

16. A vertical axis washing machine appliance, comprising:
  a cabinet;
  a wash tub disposed within the cabinet;
  a wash basket rotatably mounted within the wash tub, the wash basket configured for receipt of laundry articles;
  an agitation element rotatable about an axis of rotation, the agitation element extending at least partially into the wash basket and configured for imparting motion to laundry articles within the wash basket;
  a torque source;
  a wash basket drive element selectively connectable with the torque source;
  an input shaft coupled to the torque source and rotatable about the axis of rotation when driven by the torque source;
  a sun gear attached to or integrally formed with the input shaft, the sun gear having a plurality of helical teeth;

a ring gear annularly disposed about the axis of rotation and connected to the wash basket drive element, the ring gear having a plurality of helical teeth;

a first ball bearing coupling the input shaft with the wash basket drive element, wherein the input shaft is press fit into the first ball bearing and the first ball bearing is press fit into the wash basket drive element;

a carrier rotatable about the axis of rotation;

one or more planetary gears supported by the carrier, each of the one more planetary gears having a plurality of helical teeth, the one or more planetary gears in meshing engagement with the sun gear and the ring gear and each of the one or more planetary gears configured to rotate about a rotation axis and revolve about the sun gear for driving the carrier about the axis of rotation;

an output shaft connected to the carrier and rotatable about the axis of rotation when driven by the carrier, the output shaft coupled with the agitation element for driving the agitation element about the axis of rotation; and a second ball bearing coupling the output shaft with the wash basket drive element, wherein the output shaft is press fit into the second ball bearing and the second ball bearing is press fit into the wash basket drive element.

17. The vertical axis washing machine appliance of claim 16, wherein the wash basket drive element comprises a lower spin tube, a main spin tube, and an upper spin tube, and wherein the input shaft is concentric with the lower spin tube, the output shaft is concentric with the upper spin tube, and wherein the sun gear, the one or more planetary gears, and the ring gear are disposed within a transmission chamber defined by the main spin tube, and wherein the first ball bearing is press fit into the lower spin tube of the wash basket drive element and the second ball bearing is press fit into the upper spin tube of the wash basket drive element.

18. The vertical axis washing machine appliance of claim 17, wherein the washing machine appliance defines a vertical direction and wherein the axis of rotation extends substantially along the vertical direction, and wherein the vertical axis washing machine appliance further comprises:

a support housing defining a cavity in which the main spin tube of the wash basket drive element is received, the support housing connected to the wash tub;

a lower bearing coupling the support housing with the lower spin tube; and an upper bearing coupling the support housing with the upper spin tube;

wherein the first ball bearing couples the input shaft with the lower spin tube above where the lower bearing couples the support housing with the lower spin tube along the vertical direction and wherein the second ball bearing couples the output shaft with the upper spin tube below where the upper bearing couples the support housing with the upper spin tube along the vertical direction.

19. The vertical axis washing machine appliance of claim 16, wherein the vertical axis washing machine appliance defines a vertical direction and the axis of rotation extends substantially along the vertical direction, and wherein the output shaft defines a recess extending circumferentially about an outer diameter of the output shaft, and wherein the washing machine appliance further comprises:

an e-ring at least partially disposed within the recess between the carrier and a bottom end of the output shaft along the vertical direction.

20. A washing machine appliance defining a vertical direction, the washing machine appliance comprising:

a cabinet;

a wash tub disposed within the cabinet;

a wash basket rotatably mounted within the wash tub, the wash basket configured for receipt of laundry articles;

an agitation element rotatable about an axis of rotation that extends substantially along the vertical direction, the agitation element being positioned within the wash basket and configured for imparting motion to laundry articles within the wash basket;

a torque source;

a wash basket drive element coupled to the wash basket and selectively connectable with the torque source;

an input shaft coupled to the torque source and rotatable about the axis of rotation when driven by the torque source;

a sun gear attached to or integrally formed with the input shaft, the sun gear having a plurality of helical teeth;

a ring gear annularly disposed about the axis of rotation and connected to the wash basket drive element, the ring gear having a plurality of helical teeth;

a first bearing coupling the input shaft with the wash basket drive element;

a carrier rotatable about the axis of rotation;

one or more planetary gears supported by the carrier, each of the one more planetary gears having a plurality of helical teeth, the one or more planetary gears in meshing engagement with the sun gear and the ring gear and each of the one or more planetary gears configured to rotate about a rotation axis and revolve about the sun gear for driving the carrier about the axis of rotation;

an output shaft connected to the carrier and rotatable about the axis of rotation when driven by the carrier, the output shaft coupled with the agitation element for driving the agitation element about the axis of rotation, the output shaft defining a recess extending circumferentially about an outer diameter of the output shaft;

a second bearing coupling the output shaft with the wash basket drive element;

a c-clip at least partially disposed within the recess; and a spring clip at least partially disposed within the recess between the c-clip and the carrier along the vertical direction.

* * * * *